US008788603B2

(12) United States Patent
Griffin et al.

(10) Patent No.: US 8,788,603 B2
(45) Date of Patent: *Jul. 22, 2014

(54) VOICE AND TEXT GROUP CHAT DISPLAY MANAGEMENT TECHNIQUES FOR WIRELESS MOBILE TERMINALS

(75) Inventors: Chris Michael Griffin, Naperville, IL (US); Bashar Jano, Algonquin, IL (US); Jin Woo Lee, Vernon Hills, IL (US); Mihaela Kamenova Mihaylova, Schaumburg, IL (US); Christopher Robert Dale Wilson, Carpentersville, IL (US)

(73) Assignee: BlackBerry Limited, Waterloo (CA)

( * ) Notice: Subject to any disclaimer, the term of this patent is extended or adjusted under 35 U.S.C. 154(b) by 292 days.

This patent is subject to a terminal disclaimer.

(21) Appl. No.: 13/437,200

(22) Filed: Apr. 2, 2012

(65) Prior Publication Data

US 2012/0191796 A1 Jul. 26, 2012

Related U.S. Application Data

(63) Continuation of application No. 10/197,022, filed on Jul. 17, 2002, now Pat. No. 8,150,922.

(51) Int. Cl.
*G06F 15/16* (2006.01)
*H04L 12/58* (2006.01)
*H04L 12/18* (2006.01)
*H04L 29/08* (2006.01)

(52) U.S. Cl.
CPC ............ *H04L 51/04* (2013.01); *H04L 12/1813* (2013.01); *H04L 67/306* (2013.01)
USPC ........................................................ 709/206

(58) Field of Classification Search
CPC ... H04L 67/306; H04L 61/3605; H04L 51/04; H04L 69/329; H04L 12/1813; H04L 12/1827; H04L 12/1831

USPC .......................................................... 709/206
See application file for complete search history.

(56) References Cited

U.S. PATENT DOCUMENTS 5,625,829 A 4/1997 Gephardt et al.
5,825,353 A 10/1998 Will
(Continued)

FOREIGN PATENT DOCUMENTS

WO WO2004/008336 1/2004

OTHER PUBLICATIONS

"New AIM 4.7", http://web.archive.org/web/20011112104314/http://aim.aol.com, Nov. 12, 2001. pp. 1-5.*

(Continued)

*Primary Examiner* — John MacIlwinen (57) ABSTRACT

A single content region in a chat history display is used to display entries representative of a plurality of messages corresponding to all chat histories for all of chat threads currently engaged in by a given mobile terminal. Additionally, a buddy list display supports management of chat buddies, a detail view display allows otherwise truncated messages to be displayed, and a text message editor display supports the composition of text messages. Each chat user may designate public display identifiers for purposes of identification to other chat users. Additionally, each user may designate private display identifiers for each of his/her buddies, which private display identifiers may be used to replace the public display identifiers for that user's buddies when displayed on the user's mobile terminal. In this manner, the use of speech and text based group chatting and similar services in wireless communication environments is more readily enabled.

27 Claims, 9 Drawing Sheets

(56) References Cited

U.S. PATENT DOCUMENTS

| | | |
|---|---|---|
| 5,926,179 A | 7/1999 | Matsuda et al. |
| 5,949,408 A | 9/1999 | Kang et al. |
| 6,259,449 B1 | 7/2001 | Saxena et al. |
| 6,512,497 B1 | 1/2003 | Kondo et al. |
| 6,577,328 B2 | 6/2003 | Matsuda et al. |
| 6,606,647 B2 | 8/2003 | Shah et al. |
| 6,714,793 B1 | 3/2004 | Carey et al. |
| 6,727,916 B1 | 4/2004 | Ballard |
| 6,785,712 B1 | 8/2004 | Hogan et al. |
| 6,930,994 B1 | 8/2005 | Stubbs |
| 7,113,767 B2 | 9/2006 | Vaananen |
| 2001/0034251 A1 | 10/2001 | Goto |
| 2001/0048449 A1 | 12/2001 | Baker |
| 2001/0051998 A1 | 12/2001 | Henderson |
| 2002/0016163 A1 | 2/2002 | Burgan et al. |
| 2002/0052919 A1 | 5/2002 | Morris et al. |
| 2002/0083119 A1 | 6/2002 | Matsui et al. |
| 2002/0083461 A1 | 6/2002 | Hutcheson et al. |
| 2002/0129125 A1 | 9/2002 | Avital |
| 2002/0174199 A1 | 11/2002 | Horvitz |
| 2003/0001890 A1 | 1/2003 | Brin |
| 2003/0007464 A1 | 1/2003 | Balani |
| 2003/0023691 A1 | 1/2003 | Knauerhase |
| 2003/0045279 A1* | 3/2003 | Shostak ............... 455/422 |
| 2003/0105816 A1 | 6/2003 | Goswami |
| 2003/0153341 A1 | 8/2003 | Crockett et al. |
| 2003/0225641 A1 | 12/2003 | Gritzmacher et al. |
| 2004/0015548 A1 | 1/2004 | Lee |
| 2004/0056901 A1 | 3/2004 | March et al. |
| 2004/0142720 A1 | 7/2004 | Smethers |
| 2004/0202117 A1 | 10/2004 | Wilson et al. |
| 2005/0044503 A1 | 2/2005 | Richardson et al. |

OTHER PUBLICATIONS

EPO, Appl. 04815613.7, Office Action mailed from the EPO on Apr. 4, 2012.

* cited by examiner

600 — 
- 601 List Type: GROUP
- 602 No Groups: 1
- 603 Group Name: my buddies
- 604 Recipient IDs: 412, 321, 864
- 605 No Ungrouped: 2
- 606 Recipient IDs: 123, 104
- 502 Recipient ID: 412
- 503 Recipient Name: Jane Smith
- 504 Recipient Nickname: Jane
- 505 Recipient Short Name: JS
- 607 Recipient Status: Available
- ...

*FIG. 6*

| ID: | Status: | Address: | Public Nickname: | Public Short Name: | Subscriber IDs: |
|---|---|---|---|---|---|
| 123 | Available | 123.210.12.112:2016 | JimJ | JJ | 120, 415, 654 |
| 136 | Off | 113.10.112.10:8012 | Chris | CC | 345, 246, 235, 346 |
| 876 | TextOnly | 123.10.112.10:7291 | JaneT | JT | 102, 349 |
| ... | | | | | |

| ID: | Buddy ID | Nickname: | Short Name: |
|---|---|---|---|
| 123 | 325 | Cool | OO |
| 123 | 124 | Dad | D |
| 876 | 325 | BstFrnd | JT |
| ... | | | |

VOICE AND TEXT GROUP CHAT DISPLAY MANAGEMENT TECHNIQUES FOR WIRELESS MOBILE TERMINALS

This application is a continuation of U.S. patent application Ser. No. 10/197,022, filed Jul. 17, 2002, now U.S. Pat. No. 8,150,922 the entire disclosure of which is hereby incorporated herein by reference and to which the instant application claims priority.

TECHNICAL FIELD

The present invention relates generally to communication systems incorporating speech and textual input and output modalities and, in particular, to a novel technique of managing the display of a plurality of real-time speech and text conversations (e.g., chat threads) on limited display areas.

BACKGROUND OF THE INVENTION

Text and, to a lesser degree, speech chatting systems, are generally known in the art, particularly in relation to personal computing systems. Published U.S. Patent Application Nos. 2001/0042095 A1; 2001/0011293 A1; and 2002/0023128 A1 and U.S. Pat. Nos. 6,212,548 and 6,286,034 illustrate exemplary system and user interfaces used today. A common feature of such systems is that the various conversations (or threads) are usually split out into distinct regions (or windows) on the display or screen. Furthermore, when a single thread comprises a plurality of both text and speech exchanges, such systems usually separate the two modalities. The speech is usually played over a speaker, whereas the plurality of text messages are displayed on the screen. Users have no means to reference old speech messages or distinguish when they occurred in the thread relative to other messages in that thread.

Particularly troublesome is the fact that such interfaces become unwieldy when implemented on small screen devices with cumbersome text input mechanisms (as is common on mobile terminals in today's wireless markets.)

Published U.S. Patent Application No. 2002/0023128 A1 ("the '128 Publication") describes a system where the screen area is split into six distinct windows. One window presents a chat history of one thread (the thread in focus) while another window displays a chat history of the combined plurality of the remaining threads. A chat history comprises a plurality of entries displayed on the screen that describe both inbound (i.e., received by the user's mobile terminal) and outbound (i.e., sent by the user's mobile terminal) chat messages. The entries are usually displayed on the screen in chronological order and usually only describe text messages.

The '128 Publication also exemplifies the verboseness of chat history entries displayed on the screen. An entry might list a timestamp, a thread identifier, the sender's identifier, and the message. In the case that a single message targets a plurality of individuals (i.e., a chat group), the entries may contain a list of the plurality of other recipient's information as well. The combined information of all the entries in the chat history is too overwhelming for very small displays.

Therefore, it would be advantageous to provide a technique for displaying multiple chat threads (or histories) using limited display areas. Such a technique should accommodate the occurrence of speech messages, and should avoid the verbosity of prior art techniques.

SUMMARY OF THE INVENTION

The present invention provides techniques, principally applicable to wireless communication environments, for displaying and interacting with speech and text group chat threads. In particular, the present invention describes techniques to display a plurality of chat threads in a single chat history on a limited display area. It describes a technique to build dynamic and static buddy-lists, as well as a technique to incorporate user friendly and small screen friendly nicknames that better enable users to identify and interact with users in large communities where the likelihood of name collisions is high especially when names have to be truncated to fit in small screens. Furthermore, relevant chat information is displayed to the user when needed in a manner suitable for small screens. Using the present invention, the number of steps and keypad entries the user has to take in order to perform the most common chat activities in a manner suitable of wireless devices is reduced. In a presently preferred embodiment, the techniques are distributed among a mobile terminal acting as the client in a client-server model while a chat server complex acts as the server part of a client-server model.

To this end, a single content region in a chat history display is used to display entries representative of a plurality of messages corresponding to all of the chat histories for all of the chat threads currently engaged in by a given mobile terminal. Additionally, a buddy list display supports management of chat buddies (i.e., chat users that a given chat user frequently communicates with), a detail view display allows otherwise truncated messages to be displayed, and a text message editor display supports the composition of text messages. Nicknames and other identifiers of chat participants (or users) are controlled on two levels. At the first level, each chat user may have a designated display identifier, such as a public nickname and a public short name. At the second level, each user can designate private display identifiers, such as a private nickname and a private short name for each of his/her buddies, which private display identifiers may be used to replace the public display identifiers for that user's buddies when displayed on the user's mobile terminal. By incorporating the techniques described herein, as opposed to prior art techniques that relied on multiple windows and a bias towards simultaneously displaying all available information at all times, the use of speech and text based group chatting and similar services in wireless communication environments is more readily enabled.

DETAILED DESCRIPTION OF THE PREFERRED EMBODIMENT

Figure 1:
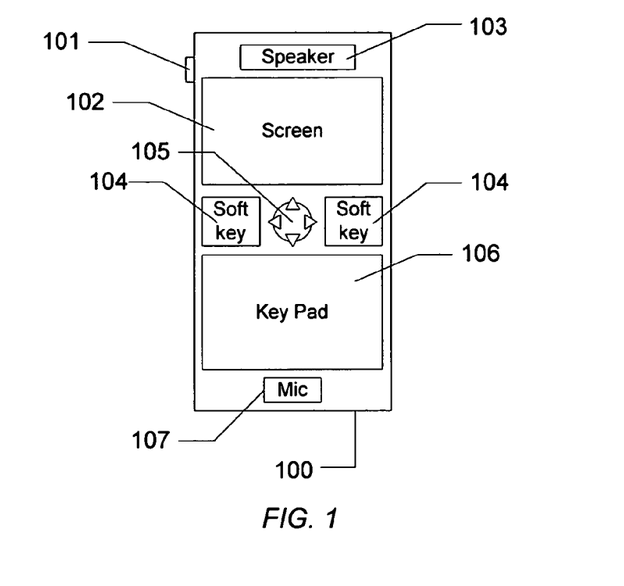
FIG. 1 is a schematic illustration of a wireless mobile terminal in accordance with the present invention.

The present invention may be more fully described with reference to FIGS. 1-14. FIG. 1 illustrates a wireless mobile terminal 100 that may comprise any wireless communication device such as a handheld cellular phone or a wirelessly enabled Personal Digital Assistant (PDA). The configuration of the mobile terminal 100 shown in FIG. 1 is exemplary only, and it is generally understood that a variety of terminals and terminal configurations could be used. As shown, the mobile terminal 100 comprises a speaker 103 for rendering signals, such as received speech, audible; a display 102 to render text and graphical elements visible; a navigation rocker 105 that allows a user to navigate a list or menu displayed on the screen; programmable buttons (or "softkeys") 104; a keypad 106 that allows the user to input digits, letters, and other symbols (e.g., punctuation); a microphone 107 that captures audio such as the user's speech; and a push-to-talk button 101 that allows the user to initiate recording and transmission of audio. These and other components of the mobile terminal (not shown) are well known in the art and need not be described in greater detail herein. Additionally, there are a variety of styles and instances of components that can be used instead of (or in conjunction with) the components described in FIG. 1. For example, the push-to-talk button 101 may be omitted and replaced with automatic voice detection mechanisms. Touch screens and hand writing recognition techniques can replace the need for the softkeys 104, the navigation rocker 105, and the keypad 106. The present invention is not limited in this regard. Additional components of the terminal that are not necessarily visible to the user but are necessary to implement chat functionality are further described with reference to FIG. 3. The input devices available on the wireless mobile terminal (e.g., keypad, softkeys, etc.) may be employed by a user of the wireless mobile terminal to initiate a session of chat software and, within the operation of the chat software, to initiate one or more chat conversations (threads) as described in greater detail below.

Figure 2:
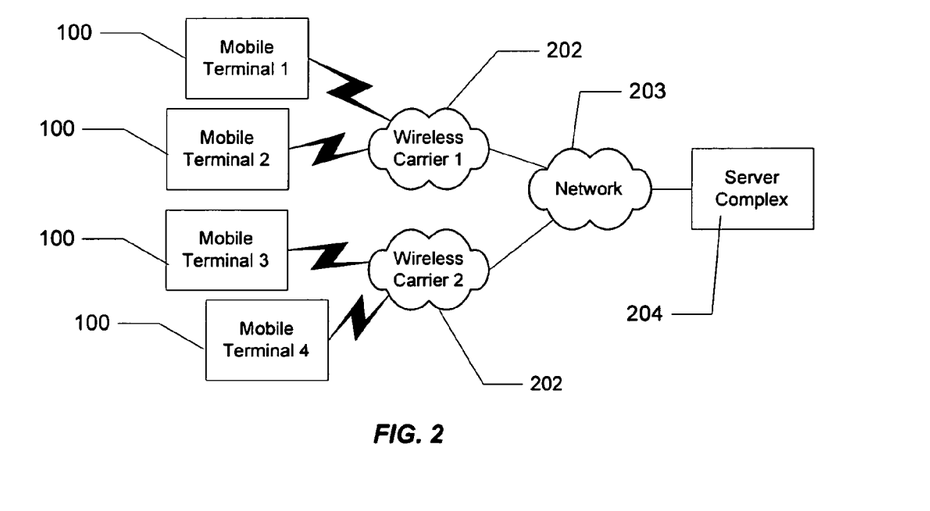
FIG. 2 is a block diagram of a wireless communications system in accordance with the present invention.

FIG. 2 illustrates the overall system architecture of a wireless communication system comprising a plurality of mobile terminals 100 in accordance with the present invention. The terminals 100 communicate with at least one chat server complex 204 by wirelessly transmitting data to a corresponding wireless carrier's infrastructure 202. As known in the art, the wireless carrier infrastructures 202 comprise those elements necessary to support wireless communications with the terminals 100. Various service providers (such as Verizon or Sprint in the U.S., or Orange in Europe) build and maintain such infrastructures. The data packets are sent on to a communication network 203 that forwards them onto the server complex 204. The communication network 203, which is a packet-based network, may comprise a public network such as the Internet or World Wide Web, a private network such as a corporate intranet, or some combination of public and private network elements. The server complex 204 preferably comprises a plurality of networked server computers that may be programmed to implement the functionality described below. The particular number of servers used and the manner in which they communicate with each other is a matter of design choice. Techniques for programming server computers and mobile terminals in accordance with the present invention are well known in the art.

When the server complex 204 communicates with one or more mobile terminals, the server complex 204 sends its data to the network 203 that, in turn, forwards the data onto at least one of the carrier infrastructures 202. Each relevant carrier infrastructure 202 then transmits the data to one or more of its corresponding mobile terminals 100. Preferably, when a plurality of users chat together (i.e., send chat messages from one terminal 100 to another), data comprising text, speech, and/or graphical messages (or some combination thereof) are sent to the server complex 204. The server complex 204 then sends copies of the message out to the targeted terminals 100, preferably including, in one embodiment, the initiating or sending terminal. Those having ordinary skill in the art will recognize that the server complex 204 can be placed inside a wireless carrier's infrastructure 202, or that it may be eliminated in cases where direct terminal-to-terminal transfer is supported. In the latter case, substantially all of the chat messaging functionality is supported by the mobile terminals. Furthermore, the present invention would benefit systems other than packet data based systems, as well as systems that are limited in scope to a single wireless carrier's domain.

Figure 3:
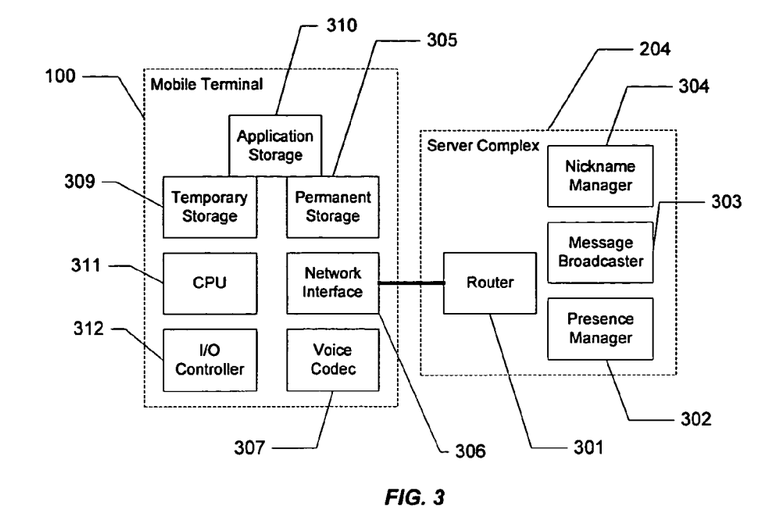
FIG. 3 is a block diagram of wireless communication chat components in accordance with the present invention.

FIG. 3 illustrates in more detail components found in both the terminals 100 and the server complex 204 used to exchange group speech and text chat messages. Focusing on the components of the terminal 100, machine-readable and executable instructions (typically referred to as software, code, or program) are preferably stored in an application storage (or memory) 310 and executed (or run) on a central processing unit (CPU) 211. All storage devices described herein may comprise any combination of volatile (e.g., random access memory) or non-volatile (e.g., read-only memory) storage as known in the art. Likewise, the CPU 211 may comprise a microprocessor, microcontroller, digital signal processor, co-processor, similar devices or combinations thereof. Using known programming techniques, the software can manipulate the display 102, capture speech from the microphone 107, capture input data from the key pad 106, navigation rocker 105, soft keys 104 and/or push-to-talk button 101 using the I/O controller 312. Outbound chat messages sent to the server complex 204, as well as those inbound chat messages received from the server complex 204, pass through the network interface 306 that provides connectivity between the terminal and the data network. Where the terminal 100 comprises a wireless device, the network interface 306 comprises the entire physical interface necessary to communicate with the server complex 204, including a wireless transceiver. Preferably, but not necessarily, speech sent to the server complex 204 is first encoded using a voice codec 307, which may be implemented in software. Similarly, voice from the server complex 204, may, when necessary, be decoded using the voice codec 307 before it is sent to the speaker 103. The software uses temporary storage 309 to save working data that does not persist between software initiations (sessions). On the other hand, the software uses the permanent storage 305 to persist data for longer periods of time that can span multiple software sessions.

Figure 7:
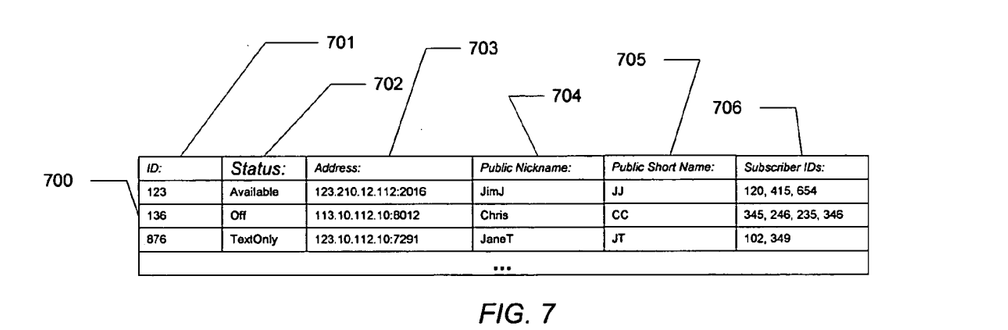
FIG. 7 is a table that illustrates the data contained in a presence manager in accordance with the present invention.

Focusing on components of the server complex 204, the data traffic comprising encoded speech and text messages (e.g., outbound chat messages 400; see FIG. 4) flows into the server complex 204 preferably via the router 301. Note that the router 301, presence manager 302, message broadcaster 303 and nickname manager 304 may be implemented on one or more server computers or the like residing within the server complex 204. The router 301 directs the outbound chat message 400 towards a message broadcaster 303 that determines the plurality of inbound chat message copies (e.g., inbound chat messages 500; see FIG. 5) needed and their destinations. In the context of the present invention, the term inbound refers to messages directed to one or more mobile terminals, whereas the term outbound refers to messages sent by mobile terminals. The message broadcaster 303 decomposes the incoming message 400, and locates the list of recipient identifiers 402. It then queries a presence manager 302 to establish the recipients' current status 702 (i.e., an indicator of whether the recipient is ready to receive the particular type of message, speech and/or text messages only, etc.) and the terminal's address 703. FIG. 7 illustrates a table with the plurality of presence data records 700 contained within the presence manager 303. Each presence record 700, comprises the user's identifier 701, the current status 702, the current terminal address 703 (if known), a public display identifier, such as a public nickname 704 and a public short name 705, and a plurality of other user identifiers 706 that subscribe to the presence information of the user corresponding to that record. The public display identifiers or public nickname set 704-705 is used in inbound chat messages 500 sent to the terminal 100 unless the receiver (i.e., the receiving user) overrides the public nickname set 704-705 with private display identifiers or a private nickname set 802-803. When presence status 702 changes, the presence manager 302 sends a buddy list update message 600 to all the subscribers listed in the subscriber identifier field 706 of the corresponding presence record 700. Those having ordinary skill in the art will recognize that presence records 700 may contain other information and attributes such as forwarding address, processing rules that describe what to do in various circumstances, graphical representation for various status, profiles (i.e., a plurality of a different value sets that could be used at various times or depending on the receiver, etc.) and so on.

Although not illustrated in FIG. 3, the server complex 204 may include other components such as authentication and encryption servers that ensure the authenticity of the chat communication messages and secure the privacy of their content. The server complex 204 may also include a plurality of other components like speech-to-text and text-to-speech translators, natural language translators, voice transcoders, and other similar transformation gateways that transform the message, its contents, and any attachments (e.g., ring-tones, images, and so on) to a more meaningful and usable format by the receiver. Techniques for implementing such other components are well known in the art.

Figure 5:
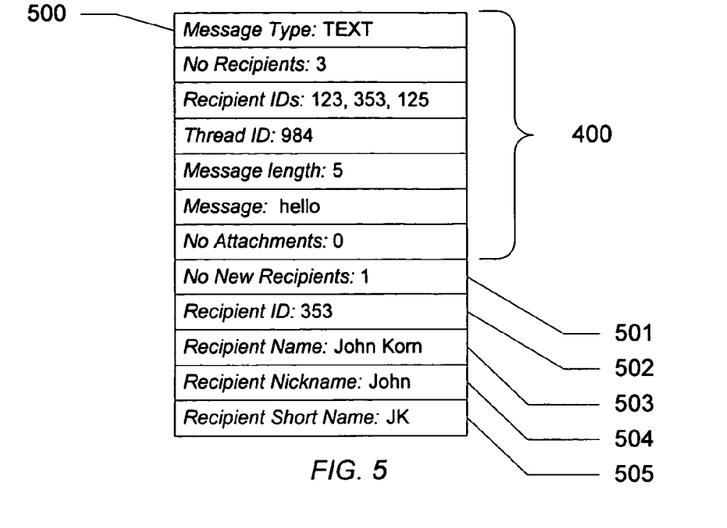
FIG. 5 is a schematic illustration of an inbound text message in accordance with the present invention.

Preferably, a nickname manager 304 resides in the server complex 204 and is responsible for managing lists of nickname sets 802-803 used by the receiver of an inbound chat message 500 to override public nicknames and short names. Note that nicknames and short names differ primarily in their length. Nicknames may be of any arbitrary length (possibly limited as a matter of design choice), whereas short names are preferably fixed in length or size. Additionally, nicknames and short names are instances of display identifiers used to identify the originators of chat messages. Such display identifiers are distinguished from identifiers used internally by the present invention to identify particular users (e.g., identifiers having reference numerals 701, 403, and 604 in the accompanying FIGs).

Figure 8:
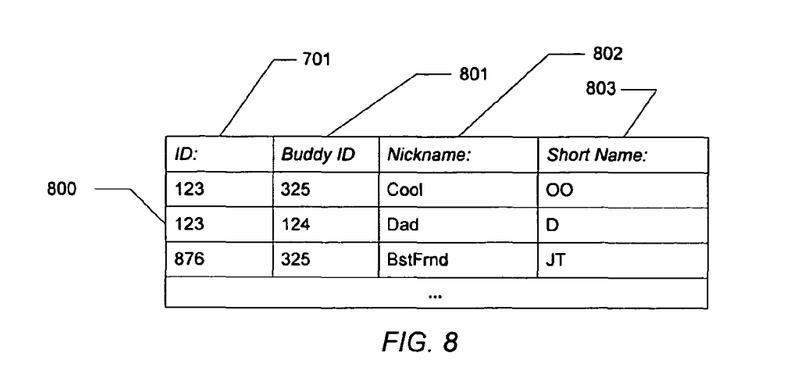
FIG. 8 is a table that illustrates the data contained in a nickname manager in accordance with the present invention.

FIG. 8 illustrates the nickname record 800 contained within the nickname manager 304. Preferably, each nickname record 800 comprises a receiving user's identifier 701, the buddy's identifier 801 (i.e., the identifier of the chat buddy for whom the receiving user desires the message broadcaster 303 to replace the buddy's public nickname set 704-705 with the receiver's private nickname set 802-803 on all inbound chat messages 500) and the private nickname 802 and private short name 803. Like the case of presence records 700, those having ordinary skill in the art recognize that nickname records 800 may contain other information and attributes such as forwarding address, processing rules, graphical representation for various status, profiles (i.e., different field values that could be used in various times, etc.) and so on. Upon receiving a message targeted to a recipient designated by the receiving user's identifier 701, the nickname manager 304 determines the buddy identifier 801 (i.e., the identification of the chat participant that initiated transmission of the message). Based on the buddy identifier 801, the nickname manager 304 inspects the nickname records corresponding to the targeted recipient. If the buddy identifier is not found in the targeted recipient's nickname records, the message is sent to the targeted recipient as in inbound message with the public nickname and public short name of the sender. In this case, the public nickname and/or short name of the sender will thereafter be displayed on the targeted recipient's mobile terminal display. If the buddy identifier is located in the targeted recipient's nickname records, the nickname manager determines the private nickname and private short name associated with the buddy's identifier and replaces the public nickname with the private nickname and the public short name with the private short name in the subsequent inbound message sent to the targeted recipient, thereby causing the private nickname and/or private short name to be displayed on the recipient's mobile terminal display. In this manner, users (i.e., recipients) have a greater degree of control over how chat histories are displayed on their terminals. Note that the process of determining private display identifiers and substituting them for public display identifiers could be performed by the mobile terminals assuming that the necessary nickname records are stored on the mobile terminals.

Figure 4:
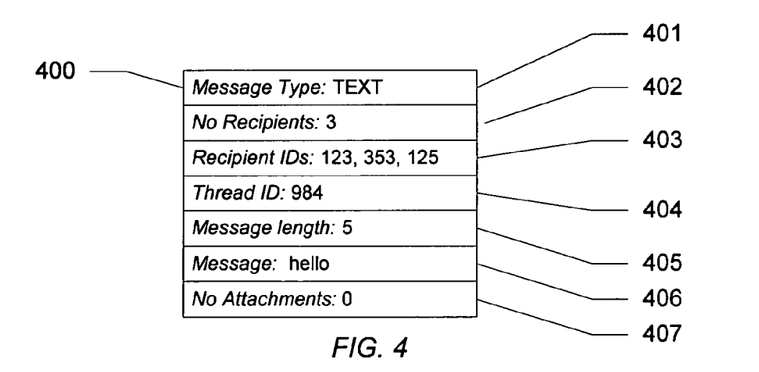
FIG. 4 is a schematic illustration of an outbound text message in accordance with the present invention.

FIG. 4 illustrates an outbound chat message 400 that the terminal 100 sends to the message broadcaster 303. The outbound chat message 400 comprises a message type 401 (e.g., text, speech, and so on), a number of intended recipients 402, a plurality of recipient identifiers 403, a thread identifier 404, a message length 405, message content 406, and a number of attachments 407. Preferably, the mobile terminal 100 generates the thread identifier 404 by aggregating a client identifier and a session identifier with a thread sequence number. The thread sequence number is a terminal-side number that starts from 0 each time a session is initiated. The client increments the thread sequence number by 1 each time the terminal 100 generates a new thread. Although not illustrated in FIG. 4, the payload may contain message encoding types and other attachments (e.g., icons, ring-tones, and so on). Those having ordinary skill in the art will appreciate that other elements can be added to the outbound chat message, such as sequence numbers, time stamps, and so on.

The message broadcaster 303, upon receiving the outbound chat message 400, first compiles a list of target recipients comprising the sender's identifier (i.e., the first recipient identifier in the recipient identifier list 403) and the plurality of other recipient identifiers (i.e., the recipient identifiers in the identifier list 403 other than the sender's identifier). For each target, the message broadcaster 303, determines the status 702 of the target by locating the target's identifier in a presence record 700 with the matching identifier 701. For each available target (i.e., where the presence record indicates that the recipient can receive the message type 401), the broadcast manager 303, composes an inbound chat message 500. The message broadcaster 304 queries the nickname manager 304 to find the receiver's local nickname set 802-803 for the other recipients (i.e., the identifiers comprising the original list of targets without the receiver's identifier.) If no information is found (i.e., the receiver did not build a nickname record 800 for the particular recipient), the message broadcaster 304 queries the presence manager 302 for the recipient's public nickname information 704-705. The message broadcaster 303 extracts the receiver's address 703 from the presence manager 302 and sends the inbound message 500 to the receiver's terminal 100 via the router 301. Those having ordinary skill in the art will doubtlessly recognize that means to optimize the creation and broadcasting of messages, such as using common compression and encoding techniques may be employed, and that other information may be included in the inbound chat message 500, such as sequence numbers, timestamps, and so on.

FIG. 5 illustrates an inbound message 500 sent by the server complex 204 to the terminal 100. As shown, the inbound message 500 is largely a copy of an outbound chat message 400 sent from a terminal 100 to the server complex 204. The inbound message 500 preferably comprises the original outbound message 400 and a definition of new users not known to at the terminal 100 (i.e., not already in the receiver's buddy-list.) The new user definition comprises the number of new definitions 501 and a plurality of individual definitions comprising the recipient's identification 502, full name 503, public nickname 504, and public short name 505. In some cases, the original outbound message has to be transformed to be understood by the receiving terminal 100. It should also be noted that the server complex 204 may only need to include the new user definition once during a session. That user definition is placed in the terminal's 100 temporary storage 309. This enables less wireless data transfer. Other attributes can be placed in the inbound chat message 500 including such things as time stamps, sequence numbers, and so on. It should be noted also, that anonymous identifications and virtual or group identification could be used as well.

Figure 6:
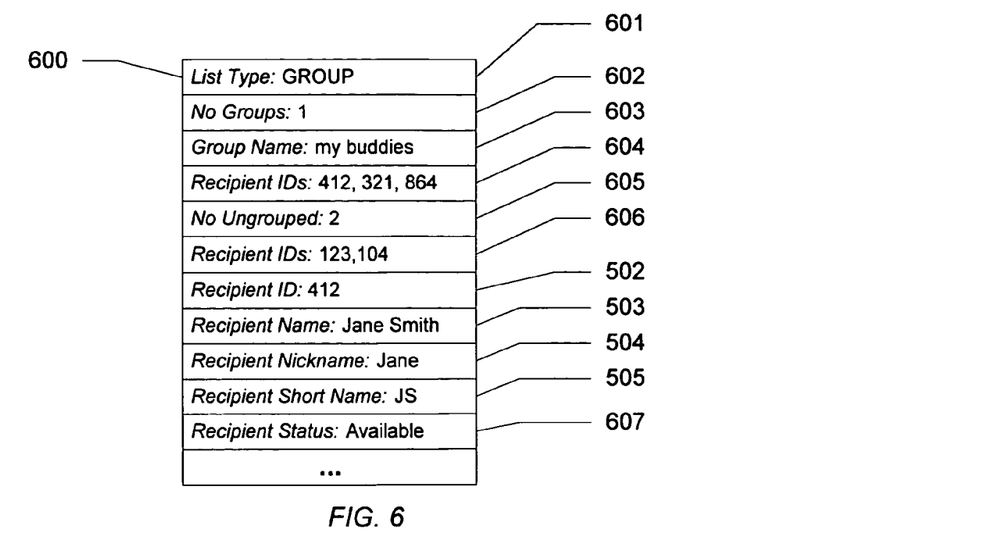
FIG. 6 is a schematic illustration of a buddy list update message in accordance with the present invention.

When a participant's presence status 702 changes, the message broadcaster 303, sends a buddy list update message 600 to other users subscribed to the participant's presence status 702. FIG. 6 illustrates a buddy list update message 600 sent from the server complex 204 to the mobile terminal 100. The message 600 comprises a list type 601 (e.g., alphanumeric list, group list, etc.), the number of groups identified in the message 602, at least one group definition 603-604, a list of ungrouped individuals 605-606, and a plurality of user definitions 502-505, 607. Note that the recipient status field 607 indicates the value of the presence status 702. A group definition, in this context, comprises a group name 603 and a plurality of recipient identifiers 604. A recipient's identifier can exist in a plurality of group definitions. However, preferably, there will be only one user definition 502-505, 607. Furthermore, preferably, for each identifier in the list of recipient's identifiers 604, there is at least one user definition 502-505, 607 for that recipient in the buddy list update message 600. The list of ungrouped individuals is a special unnamed group. It comprises the number of ungrouped individuals 605 and the list of recipient identifiers 606. Preferably, recipient identifiers in the ungrouped definition cannot be in other groups. Those having ordinary skill in the art will recognize that the records 600 can contain other fields of attributes and information such as presentation icons, audicons, and so on. In addition, it should be noted that the message does not have to contain the entire list of groups and individuals on updates, rather incremental updates could be used instead.

The presence manager 302 may send buddy list update messages 600 to the terminal 100 upon receiving a refresh request from the terminal 100. Those having ordinary skill in the art will recognize other reasons to send buddy list updates (e.g., initial connection,) as well as optimizations in the form of encoding the contents, sending incremental updates instead of the entire list, and so on.

In another embodiment, parts (or all) of the functionality of the message broadcaster 303 and the nickname manger 304 can reside on the terminal 100. In that case, the terminal 100 communicates with the server complex 204 when it exchanges presence information. Chat communication messages are broadcast from one terminal 100 to the plurality of other terminals 100 in a point-to-point fashion.

Figure 9:
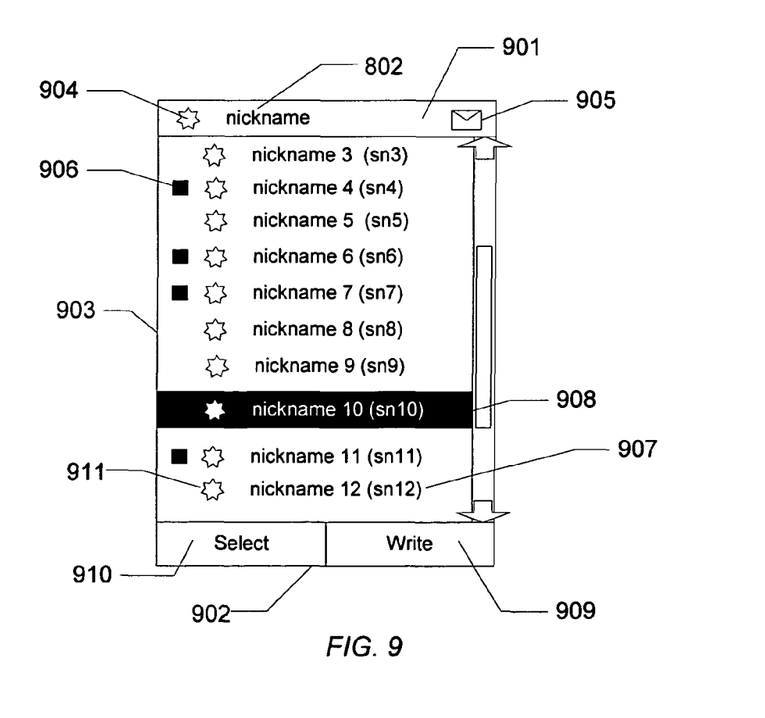
FIG. 9 is a schematic illustration of a buddy list display listed in alphabetical order in accordance with the present invention.

FIG. 9 illustrates a buddy list display with its entries sorted alphabetically. In a preferred embodiment, the screen 102 is divided into three regions. In a topmost region, there is a title bar region 901 allowing the display of one line of text and graphic symbols (i.e., icons). The software uses this region 901 to provide the user notices and other meta-information about the current task. In the case of the buddy list display, the title bar 901 comprises the user's own presence indicator 904, the user's own public nickname 704, and, on occasion, an inbound chat message indicator 905. Preferably, the presence indicator 904 is a icon that varies in appearance depending and the presence status 702 (i.e., there is a different and distinguishable feature associated with the various status values). Preferably, the inbound chat message indictor 905 is an icon accompanied by an audible sound when the icon is first displayed. Combined, the visual and audible notice indicate to the user that there is at least one unheard and/or unread inbound chat message 500 that has arrived at the terminal 100. If the user's nickname is too long for the title bar 901, the software scrolls the title bar leaving only the inbound chat message indicator 905 in a fixed position for quick access. There are many familiar examples in the art today of such display techniques, any of which may be incorporated for use with the present invention.

In the middle region of the display is a content region 903. In the case of the buddy list display, the software preferably places a multi-selection list in the content region 903, which list has a plurality of entries each representing a buddy that was received by the terminal 100 from the server complex 204 in a buddy list update message 600 and stored in the temporary storage 309. Each entry can be highlighted 908 by the user. Highlighting and navigating list entries are implemented using common techniques in the art. Each entry in the list comprises a selection indictor 906 that indicates whether the user has selected the particular buddy for chatting (i.e., sending a chat communication message), the buddy's presence status 911, the buddy's nickname 802 or 704, and/or the buddy's short name indicator 907. Note that symbols other than text could serve the same function as the short name indicator 907 for the short name information 705 or 803. For example, icons or other graphical elements could be used so long as they sufficiently differentiate buddies from one another. Further still, a combination of such graphical elements and text could be used if sufficient screen space is available.

On the bottom of the screen 102 is a softkey label region 202, familiar to those having ordinary skill in the art. Preferably, there is a minimum of two labels 909-910. The number of labels depends on the actual number of softkeys 104 available on the terminal 100. In the illustrated embodiment, the left softkey label 910 is "select" while the right softkey label 909 is "write" if there is at least one selected entry in the buddy list. Otherwise, the right softkey label 909 is labeled "chat". If the user activates the left softkey with a single click (referred to onward as "single-clicking"), the highlighted entry 908 is selected (or deselected if it was already selected,) and consequently its selection indicator 906 changes to reflect the new state. If the user presses and holds (referred to onward as "click-holding") the left softkey, the software presents the user with a plurality of options such as the option to deselect or select the entire list; switch to other displays (e.g., chat history display described in FIG. 11, group ordered buddy list display described in FIG. 10, etc.); request the details of the buddy (e.g., full name, the public nickname set 704 705, etc.); change the nickname set 802-803; show or hide fields (e.g., the short name indicator 907), and so on. Once again, techniques for programming such functionality and associating it with single-clicking and/or click-holding are well known in the art.

If no buddies are selected, the right softkey label is "chat". Single-clicking or click-holding the right softkey in this context switches the user to chat history display described in more detail with reference to FIG. 11. If the user pushes the push-to-talk button 101 (referred to onward as pushes-to-talk,) an audible indicator reminds the user that buddies have to be selected first. If there is at least one buddy selected, single-clicking or click-holding the right softkey begins to compose a message for a new thread to the selected buddies. The display in that case switches to the text message editing display described in more detail with reference to FIG. 14. If the user pushes-to-talk, the display switches to the chat history, and the user is able to record and transmit a speech message and consequently start a new thread with the selected buddies.

Figure 10:
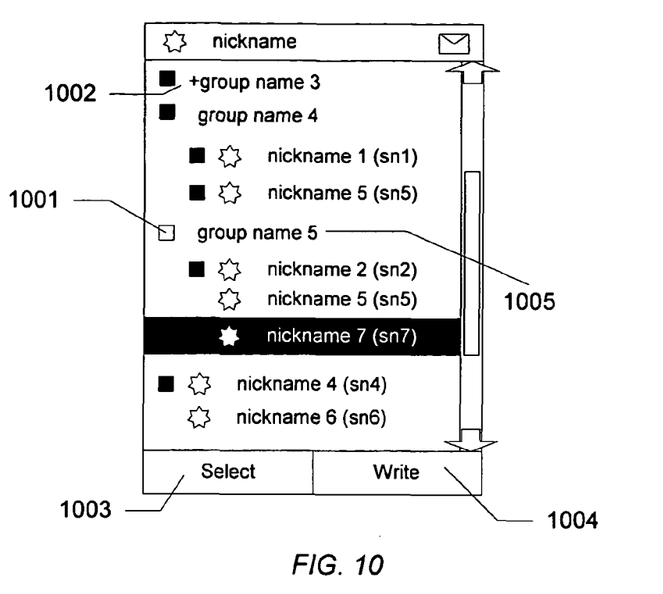
FIG. 10 is a schematic illustration of a buddy list display listed in group order in accordance with the present invention.

FIG. 10 illustrates a buddy list display with its entries sorted by group. In a preferred embodiment, group entries and their member buddies are listed first followed by a list of ungrouped buddies. Individual entries are identical to those displayed in an alphabetically ordered list with the exception to a preferred indentation (i.e., an annotation that indicates membership to a group). Group entries comprise a group name 1005 and a group selection indicator 1001 which is similar to the individual selection indicator 906 except that a group selection indicator can indicate more that just selected and unselected states; it can indicate partial selection as well. Referring to the examples illustrated in FIG. 10, solid squares (group selection indicators) such as in groups 3 and 4, are completely selected. Group 5 has an empty square indicating partial selection. If there is a group without any of its members selected, there is no indicator at all on the group level (or the individual buddy level). To select a group, a user can either select all the members one by one or select the group directly. To partially select a group, a user can start by selecting a group then deselecting one or more member. Alternatively, a user can start with an unselected group and select one or more members. A group entry can be collapsed (i.e., the members of the group are suppressed from the display.) In that case, the entry is annotated with a collapse indicator 1002. If the user highlights a collapsed group for a length of time, the group automatically expands to show the members. When the user moves to another group, the group display style reverts back to its collapsed state again. If a user selects or deselects a group entry, all the members of the group are automatically selected or deselected. The softkey labels 1003-1004 are similar in behavior to those described with reference to FIG. 9. However, click-holding when a group entry is highlighted (or an individual within a group is highlighted) presents the user with additional options to mange the group, such as renaming the group; removing the group or its the member; adding a new group or individual, collapsing or expanding the group; collapsing or expanding all groups; and so on. It should be noted that, in a preferred embodiment, only one level of grouping is allowed (i.e., nested groups are not allowed), although multiple levels could be provided.

Preferably, where the system supports presence profiles that are coupled to recipient users or groups, then as the user highlights the plurality of buddy entries 908, the user's presence indicator 904 and nickname 704 in the title bar 901 will vary to indicate the presence information of that particular buddy (or group of buddies). Also, it should be noted that if the information in the highlighted entry 908 is too long, the software can scroll the information, expand it, or use other techniques common to the art to present all the information to the user.

It is understood that there are other means to order lists (by date, events, and so on), and that other annotations could be added to the entries. For example, an indicator that there are messages that have not been read/heard available from the individual or group may be used.

Figure 11:
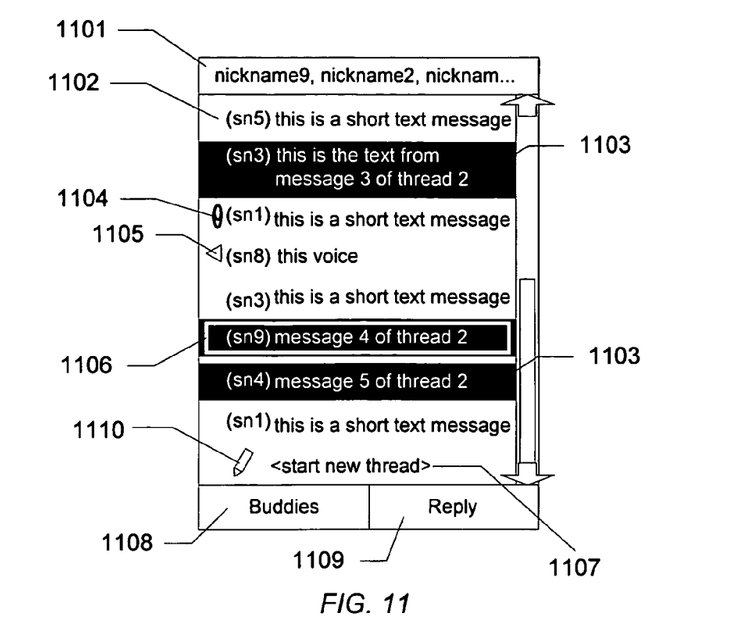
FIG. 11 is a schematic illustration of a chat history display in accordance with the present invention.

FIG. 11 illustrates a chat history display. The content region 903 of the display is a single selection list comprising a plurality of entries representing inbound chat messages 500 received by the terminal 100 and a plurality of entries representing outbound chat messages 400 transmitted by the terminal 100. Outbound chat messages are preferably echoed back to the sender in full or in part (e.g., speech messages might not include the actual speech sent) in the form of inbound messages. That is, outbound chat messages go to the server complex for transmission to the targeted recipient(s). In addition to sending the message to the targeted recipient(s), the message broadcaster sends a copy of the outbound message to the transmitting terminal (i.e., the sender) as an inbound message. In some cases, the copy of the message (the inbound message) to the transmitting terminal might not be identical to the message that was sent (the outbound message). For example, in a presently preferred embodiment, the speech content of an outbound voice message is not copied back to the transmitting terminal; only a text portion of a voice message is sent back as in inbound message. (Note that, in a presently preferred embodiment, voice messages have text appended to them, even if only a generic character string or symbol is used to indicate that the message was a voice message. Of course, if speech-to-text conversion is available, the actual speech content of the message could be converted to text and copied back to the transmitting terminal.) In this manner, the occurrence of voice message results in an entry being displayed on the screen. In an alternative embodiment, rather than having the text of an outbound message sent back to the transmitting terminal via an inbound message, the transmitting terminal can locally echo the text to the display directly. In this manner, use of wireless resources may be minimized.

In the example of FIG. 11, each entry comprises an attachment indicator 1104-1105 that indicates if there is any attached content (e.g., documents, files, etc.) or transmitted speech available; the short name of the sender 705 or 803, and at least part of the message content or text (all of the text if the text fits within 2-3 lines). Although not illustrated in FIG. 11, there may be other indicators present on an entry such as a locked entry indicator (i.e., indicates that an entry was saved in permanent storage 305 and will always appear in the chat history display until it is unlocked). Note that lesser amounts of information may be included in each entry of the display.

For example, only the message content could be displayed without the short names of the senders.

When an entry is highlighted 1106, the plurality of nicknames 802 or 704 of the sender and the other recipients is placed in the title bar 1101. If the list is too long, the contents of the title bar 401 scroll. Alternatively, short names or other symbols may be used in place of the nicknames in the title bar 1101. As the user selects an entry 1106, all related chat messages in the same thread are emphasized 1103 as well. Emphasis can be done by changing or annotating the related entries or changing unrelated entries (e.g., graying out the entries). If a selected entry is too long to be displayed in its entirety and is selected for a length of time, the contents of the entry can expand automatically to display the entire text content. In that case, when the user moves to another entry, the entry immediately shrinks back to fit within its originally allocated space of 2-3 lines of text. The actual number of allocated lines depends on the screen size. As new inbound chat messages 400 arrive, new entries are added automatically to the list, for example, at the bottom of the list. The bottom or buddy list entry 1107 is a special entry referencing the list of buddies currently selected in the buddy list display. The user can use the entry to start a new thread with the buddies. The bottom entry 1107 only appears when the user has selected buddies, and comprises an icon 1110 distinguishing the entry from other "regular" chat message entries. If the user selects the bottom entry 1107, the list of buddies appears in the title bar 1101 in the same manner recipients are displayed when the "regular" entries of the chat history are highlighted.

The left softkey label 1108 is "buddies". Single-clicking or click-holding the left softkey switches the user to the buddy list display (see FIGS. 9 and 10). The right softkey label 1109 is "reply" if the highlighted entry is a chat message entry. Otherwise, it is labeled "write," as before. Single-clicking the right softkey moves the user to a message editor display described in more detail with reference to FIG. 14. The target recipients of a message are either derived from the list of recipients of a chat message entry 1106 or those associated with the buddy list entry 1107. In the case where the highlighted entry is a chat message entry 1106, click-holding the right softkey presents the user options similar to those described in more detail with reference to FIG. 13. Otherwise, if the highlighted entry is the buddy list entry 1107, a "send to all" action is indistinguishable from normal "reply to all action" of single-clicking. If the user pushes-to-talk, the target recipients are compiled (i.e., either the sender and recipients of the chat message entry 1106, or the buddies of the buddy list entry 1107), the title bar is updated in a manner described in more detail with reference to FIG. 12, and the recording and transfer of a speech chat message begins.

It should be noted, that if an inbound speech message arrives while the chat history display is not visible to the user, the received speech is queued up. In a current implementation, the most recently received speech message (or at least that portion that will fit in available memory) are queued at the receiving terminal. In an alternate embodiment, such queuing can occur at the server complex such that the recipient can request playback within a predetermined period of time. Further still, queuing could occur at both the terminal and the server-side such that playback may be requested from the server in the event that a given speech message is no longer available at the terminal. While the speech entry is the most recent speech entry, the associated speech remains queued and ready for automatic playback upon the user's return to the chat history display. When the user switches back to the chat history display, if the speech entry is visible on the screen, it is automatically played back. Only the last speech message received is automatically played back. The playback is abandoned if the user returned to the chat history to record and transmit a speech chat message.

Figure 12:
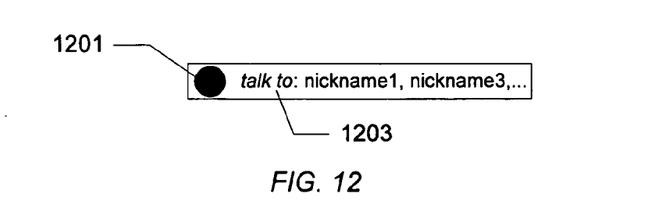
FIG. 12 is a schematic illustration of a title bar for the chat history display when speech is recorded in accordance with the present invention.

FIG. 12 illustrates the title bar of a chat history display when the user is recording and transmitting an outbound speech message. The title bar comprises a recording indicator 1201; the plurality of recipient nicknames 705 or 802 (which does not include the sender) and, optionally, a single label 1203 indicating to the user that he or she is talking to the identified recipients. If the list of recipients is too long, the list scrolls; however, the recording indicator 1201 remains fixed in position. There may be a delay between the times when the user pushes-to-talk requesting to record and transmit speech and when the system grants the user access to do so. Preferably, the recording indicator 1201 is an icon that changes its appearance (e.g., color or graphic symbol) to indicate when the user has and or loses speech recording/transmitting access. Shortly after the user releases the push-to-talk button 101, the title bar reverts back to the normal title bar 1101 on the chat history display.

Figure 13:
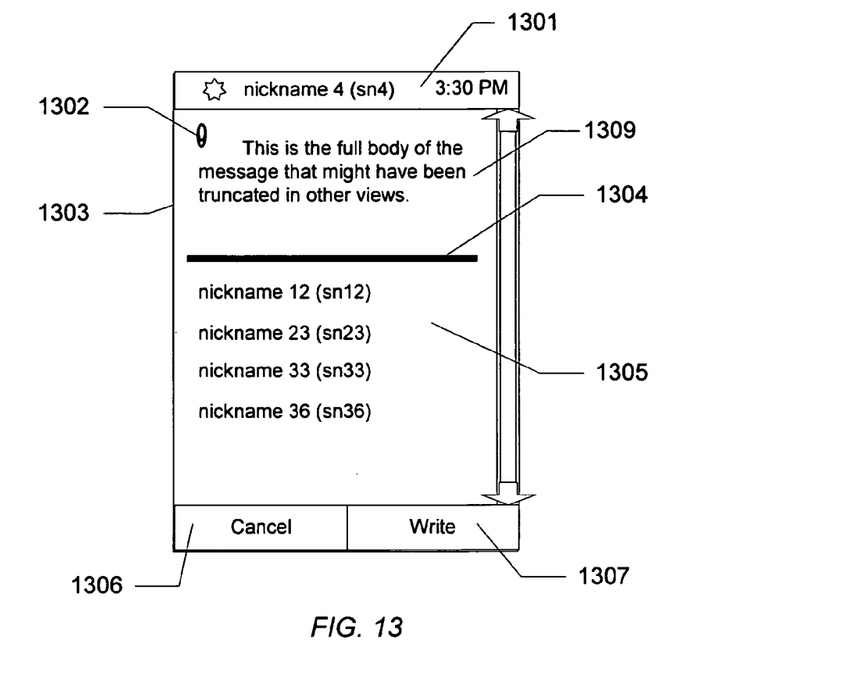
FIG. 13 is a schematic illustration of a detail view display of a single communication message in accordance with the present invention.

FIG. 13 illustrates a detail view display of an inbound chat message 500. The title bar 1301 comprises the sender's presence indicator 904; the sender's nickname 705 or 802; and optionally a time stamp (when the message was sent or received.) If the information in the title bar is too long, the nickname scrolls. In that case, the remaining indicators preferably remain fixed. The content region 1303 comprises an attachment indicator 1302 that notifies the user of the availability of attachments or speech; the full text of the message 1309; a separator 1304; and the plurality of entries representing other recipients (not including the sender or the receiver). In the example shown in FIG. 13, each entry comprises the user's nickname set 703-705 or 802-803. Alternatively, each entry could comprise only some portion of the nickname set (either the nickname or short name) or some other type of display identifier. The left softkey label 606 is "cancel". Single-clicking and click-holding the left softkey exits the display and restores the previous display. The right softkey label 607 is "write". Single-clicking the right softkey moves the user to a message editor display described in more detail in FIG. 14. Click-holding the right softkey presents the user options such as playing back the available speech; viewing or storing available attachments; locking the entry in the chat history display; saving the inbound chat message in permanent storage 305; moving to the next or previous chat message, replaying to only the sender or one of the other recipients (i.e., initiating a new thread), and so on. If the user pushes-to-talk, the detail view display is exited. The user moves to the chat history and begins talking to the sender (unless the user is the sender) and all other recipients. Playback of any queued speech is abandoned in that case.

Figure 14:
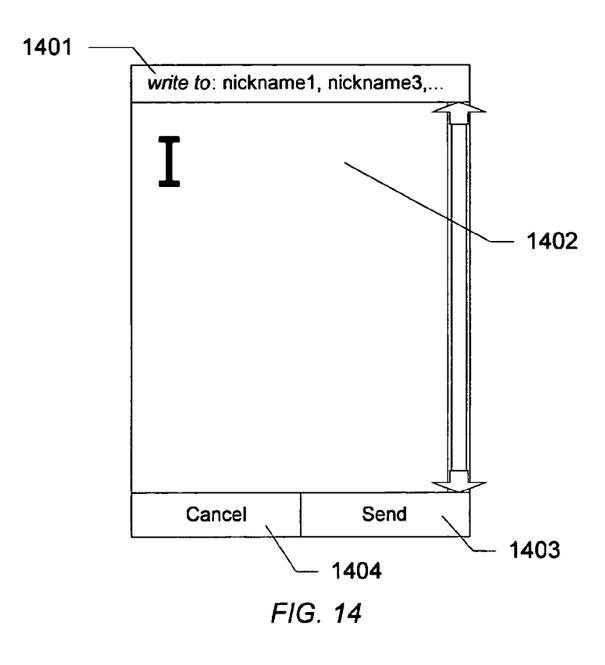
FIG. 14 is a schematic illustration of a text message editor in accordance with the present invention.

FIG. 14 illustrates a text message editor display. In this embodiment, the title bar 1401 comprises a plurality of target recipient nicknames 704 or 802 and a single action label that indicates to the user that he or she is composing a message. The title bar 1401 scrolls if the contents are too long. A text entry area 1402 is provided below the title bar 1401 for composing text messages. The left softkey label 1404 is "cancel". Single-clicking and click-holding the left softkey exits the display, preferably abandons the contents, and restores the previous display (except in the case where the previous display was a detail view display, in which case the detail view display's previous display is restored instead of the detail view display.) The right softkey label 1403 is "send". Single-clicking the right softkey causes the software to build and send an outbound text message 400. Click-holding the right softkey provides the user a set of options such as attachment of other content (e.g., ring tones, etc.), spell checking the message, displaying the full details of the recipients and so on. Preferably, if the user pushes-to-talk, the display is exited, its contents are abandoned; the user moves to the chat history and begins talking to selected recipients. Playback of any queued speech is also abandoned in that case.

The present invention as described above provides a unique technique for managing a chat display. This technique is more readily applicable to a wireless communication environment in part because of limited screen sizes on mobile wireless devices. Additionally, the present invention accommodates the use of speech-based methods in chat environments. What has been described above is merely illustrative of the application of the principles of the present invention. Other arrangements and methods can be implemented by those skilled in the art without departing from the spirit and scope of the present invention.

What is claimed is:

1. A method for displaying a plurality of chat threads on a wireless mobile terminal comprising a user input device and a display, the method comprising:
   receiving a plurality of inbound chat messages corresponding to the plurality of chat threads, each of the plurality of inbound chat messages comprising message content;
   transmitting a plurality of outbound chat messages corresponding to the plurality of chat threads, each of the plurality of outbound chat messages comprising message content and being transmitted to at least one user-selected recipient to thereby become a sent chat message;
   simultaneously displaying the message content of each of the pluralities of inbound and sent chat messages corresponding to the plurality of chat threads in a single content region of a chat history display;
   receiving at the user input device a user selection of the displayed message content of a user-selected displayed chat message corresponding to one of the displayed pluralities of inbound and sent chat messages; and
   in response to the user selection of the displayed message content of the user-selected displayed chat message:
   visually highlighting in the single content region of the chat history display the displayed message content of each of the displayed inbound and sent chat messages associated with a particular chat thread corresponding to the user-selected displayed chat message; and
   displaying in a region of the chat history display distinct from the single content region a private nickname of a sender of the user-selected displayed chat message when a buddy identifier of the sender is in the nickname records of a recipient of the one or more recipients of the user-selected displayed chat message, otherwise displaying in the region of the chat history display distinct from the single content region the public nickname of the sender,
   wherein the region of the chat history display distinct from the single content region is a title bar region of the chat history display.

2. The method of claim 1, further comprising displaying in the region of the chat history display distinct from the single content region the private shortname of the sender when the buddy identifier of the sender is in the nickname records of the recipient of the one or more recipients of the user-selected displayed chat message.

3. The method of claim 1, further comprising if the buddy identifier of the sender is not found in the recipients nickname records displaying in the region of the chat history display distinct from the single content region the public shortname of the sender.

4. The method of claim 1, further comprising determining the buddy identifier of the sender.

5. The method of claim 4, further comprising a nickname manager of a server complex determining the buddy identifier of the sender.

6. The method of claim 1, further comprising when the buddy identifier of the sender is in the nickname records of the recipient of the one or more recipients of the user-selected displayed chat message, replacing the public nickname of the sender with the private nickname of the sender and displaying in the region of the chat history display distinct from the single content region the private nickname of the sender.

7. The method of claim 1, further comprising displaying in the single content region of the chat history display a buddy list entry that references a list of user-defined buddies selected in a buddy list display.

8. The method of claim 7, further comprising displaying the buddy list entry as a last entry in the single content region of the chat history display.

9. The method of claim 1, wherein simultaneously displaying further comprises simultaneously displaying in a single selection list the message content of each of the pluralities of inbound and sent chat messages corresponding to the plurality of chat threads in the single content region of the chat history display.

10. A wireless mobile terminal comprising:
   a processor;
   a display, coupled to the processor;
   at least one input device, coupled to the processor; and
   a storage device, coupled to the processor, having stored thereon executable instructions that, when executed by the processor, cause the processor to at least
      receive via the at least one input device instructions to establish a plurality of chat threads,
      receive a plurality of inbound chat messages corresponding to the plurality of chat threads, each of the plurality of inbound chat messages comprising message content,
      transmit a plurality of outbound chat messages, input via the at least one input device, corresponding to the plurality of chat threads, each of the plurality of outbound chat messages comprising message content and being transmitted to at least one user-selected recipient to thereby become a sent chat message;
      simultaneously display the message content of each of the pluralities of inbound and sent chat messages corresponding to the plurality of chat threads in a single content region of a chat history display,
      receive at the at least one input device a selection of the displayed message content of a user-selected displayed chat message corresponding to one of the displayed inbound and sent chat messages; and
      in response to the selection of the displayed message content of the user-selected displayed chat message:
      visually highlight in the single content region of the chat history display the displayed message content of each of the displayed inbound and sent chat messages associated with a particular chat thread corresponding to the user-selected display chat message; and
      display in a region of the chat history display distinct from the single content region a private nickname of a sender of the user-selected displayed chat message when a buddy identifier of the sender is in the nickname records of a recipient of the one or more recipients of the user-selected displayed chat message, otherwise display in the region of the chat history display distinct from the single content region the public nickname of the sender,
wherein the region of the chat history display distinct from the single content region is a title bar region of the chat history display.

11. The wireless mobile terminal of claim 10, further comprising display in the region of the chat history display distinct from the single content region the private shortname of the sender when the buddy identifier of the sender is in the nickname records of the recipient of the one or more recipients of the user-selected displayed chat message.

12. The wireless mobile terminal of claim 10, further comprising if the buddy identifier of the sender is not found in the recipients nickname records display in the region of the chat history display distinct from the single content region the public shortname of the sender.

13. The wireless mobile terminal of claim 10, further comprising determine the buddy identifier of the sender.

14. The wireless mobile terminal of claim 13, wherein a nickname manager of a server complex determines the buddy identifier of the sender.

15. The wireless mobile terminal of claim 10, further comprising when the buddy identifier of the sender is in the nickname records of the recipient of the one or more recipients of the user-selected displayed chat message, replace the public nickname of the sender with the private nickname of the sender and display in the region of the chat history display distinct from the single content region the private nickname of the sender.

16. The wireless mobile terminal of claim 10, further comprising display in the single content region of the chat history display a buddy list entry that references a list of user-defined buddies selected in a buddy list display.

17. The wireless mobile terminal of claim 16, further comprising display the buddy list entry as a last entry in the single content region of the chat history display.

18. The wireless mobile terminal of claim 10, wherein simultaneously display further comprises simultaneous display in a single selection list the message content of each of the pluralities of inbound and sent chat messages corresponding to the plurality of chat threads in the single content region of the chat history display.

19. A non-transitory computer-readable medium comprising instructions for performing the method of displaying a plurality of chat threads on a wireless mobile terminal comprising a user input device and a display, the method comprising:
receiving a plurality of inbound chat messages corresponding to the plurality of chat threads, each of the plurality of inbound chat messages comprising message content;
transmitting a plurality of outbound chat messages corresponding to the plurality of chat threads, each of the plurality of outbound chat messages comprising message content and being transmitted to at least one user-selected recipient to thereby become a sent chat message;
simultaneously displaying the message content of each of the pluralities of inbound and sent chat messages corresponding to the plurality of chat threads in a single content region of a chat history display;
receiving at the user input device a user selection of the displayed message content of a user-selected displayed chat message corresponding to one of the displayed pluralities of inbound and sent chat messages; and
in response to the user selection of the displayed message content of the user-selected displayed chat message:
visually highlighting in the single content region of the chat history display the displayed message content of each of the displayed inbound and sent chat messages associated with a particular chat thread corresponding to the user-selected displayed chat message; and
displaying in a region of the chat history display distinct from the single content region a private nickname of a sender of the user-selected displayed chat message when a buddy identifier of the sender is in the nickname records of a recipient of the one or more recipients of the user-selected displayed chat message, otherwise displaying in the region of the chat history display distinct from the single content region the public nickname of the sender,
wherein the region of the chat history display distinct from the single content region is a title bar region of the chat history display.

20. The computer readable medium of claim 19, further comprising display in the region of the chat history display distinct from the single content region the private shortname of the sender when the buddy identifier of the sender is in the nickname records of the recipient of the one or more recipients of the user-selected displayed chat message.

21. The computer readable medium of claim 19, further comprising if the buddy identifier of the sender is not found in the recipients nickname records display in the region of the chat history display distinct from the single content region the public shortname of the sender.

22. The computer readable medium of claim 19, further comprising determine the buddy identifier of the sender.

23. The computer readable medium of claim 22, wherein a nickname manager of a server complex determines the buddy identifier of the sender.

24. The computer readable medium of claim 19, further comprising when the buddy identifier of the sender is in the nickname records of the recipient of the one or more recipients of the user-selected displayed chat message, replace the public nickname of the sender with the private nickname of the sender and display in the region of the chat history display distinct from the single content region the private nickname of the sender.

25. The computer readable medium of claim 19, further comprising display in the single content region of the chat history display a buddy list entry that references a list of user-defined buddies selected in a buddy list display.

26. The computer readable medium of claim 25, further comprising display the buddy list entry as a last entry in the single content region of the chat history display.

27. The computer readable medium of claim 19, wherein simultaneously display further comprises simultaneous display in a single selection list the message content of each of the pluralities of inbound and sent chat messages corresponding to the plurality of chat threads in the single content region of the chat history display.

* * * * *